United States Patent
Partridge et al.

(10) Patent No.: US 9,228,664 B2
(45) Date of Patent: Jan. 5, 2016

(54) ROTARY MULTI-PORT VALVE

(71) Applicants: Charles C. Partridge, Houston, TX (US); Kenton Chickering, III, Houston, TX (US); Bela Vaczi, Cypress, TX (US)

(72) Inventors: Charles C. Partridge, Houston, TX (US); Kenton Chickering, III, Houston, TX (US); Bela Vaczi, Cypress, TX (US)

( * ) Notice: Subject to any disclaimer, the term of this patent is extended or adjusted under 35 U.S.C. 154(b) by 103 days.

(21) Appl. No.: 14/297,609

(22) Filed: Jun. 5, 2014

(65) Prior Publication Data

US 2015/0354717 A1    Dec. 10, 2015

(51) Int. Cl.
| | |
|---|---|
| *F16K 11/074* | (2006.01) |
| *F16K 11/078* | (2006.01) |
| *F16K 25/00* | (2006.01) |
| *F16K 5/04* | (2006.01) |
| *F16K 11/085* | (2006.01) |

(52) U.S. Cl.
CPC ....... *F16K 11/0856* (2013.01); *Y10T 137/0324* (2015.04); *Y10T 137/86533* (2015.04)

(58) Field of Classification Search
CPC ............ F16K 11/0853; F16K 11/0856; Y10T 137/86533
USPC ........ 137/625.11, 625.17; 251/160, 161, 175, 251/188, 207, 209
See application file for complete search history.

(56) References Cited

U.S. PATENT DOCUMENTS

| | | | | |
|---|---|---|---|---|
| 825,370 | A * | 7/1906 | Zurbuch ................. | B62D 5/083 137/625.11 |
| 2,034,216 | A * | 3/1936 | Stout ....................... | F16K 39/06 251/110 |
| 2,840,109 | A * | 6/1958 | Wadleigh .............. | F16K 11/085 137/625.11 |
| 2,972,357 | A * | 2/1961 | Ford ......................... | B23Q 5/18 137/625.11 |
| 2,996,083 | A * | 8/1961 | Huska .................... | F16K 11/085 137/625.11 |
| 3,032,066 | A * | 5/1962 | Smith ................... | F16K 11/0856 137/580 |
| 3,212,579 | A * | 10/1965 | Del Cryer ............. | E21B 43/122 137/625.11 |
| 3,665,952 | A * | 5/1972 | Chronister .............. | F16K 11/02 137/246 |
| 3,896,855 | A * | 7/1975 | Grieger .................. | B65G 53/56 137/165.11 |
| 3,995,494 | A * | 12/1976 | Muller ................. | G01N 1/2273 137/625.11 |
| 4,989,641 | A * | 2/1991 | Jones ..................... | F16K 11/085 137/625.11 |
| 5,046,522 | A * | 9/1991 | Le Devehat ........... | F16K 11/085 137/385 |
| 5,887,569 | A * | 3/1999 | Romanelli ............. | F02M 41/06 123/450 |
| 5,901,748 | A * | 5/1999 | Jessop .................... | F16K 11/074 137/625.11 |
| 6,196,266 | B1 * | 3/2001 | Breda .................. | F16K 11/0853 137/454.6 |
| 6,648,070 | B2 * | 11/2003 | Cove ....................... | E21B 34/04 166/86.1 |
| 8,899,269 | B2 * | 12/2014 | Seim ..................... | F16K 11/085 137/454.6 |

* cited by examiner

*Primary Examiner* — John Fox
*Assistant Examiner* — Seth W Mackay-Smith
(74) *Attorney, Agent, or Firm* — James L. Jackson

(57) ABSTRACT

A rotary multi-port valve has a valve body having a primary flow port and a plurality of secondary flow ports. A rotary diverter is rotatable within the valve body and has an internal piston receptacle. A port selector piston is linearly moveable by hydraulic pressure from a de-energized position within the piston receptacle to an energized position for sealing with a selected flow port and accomplishes development of a spring force during hydraulically energized piston movement. Upon reduction of the hydraulic pressure the stored spring force returns the port selector piston to its de-energized position freeing the rotary diverter member for selective rotation to another selected flow port.

24 Claims, 10 Drawing Sheets

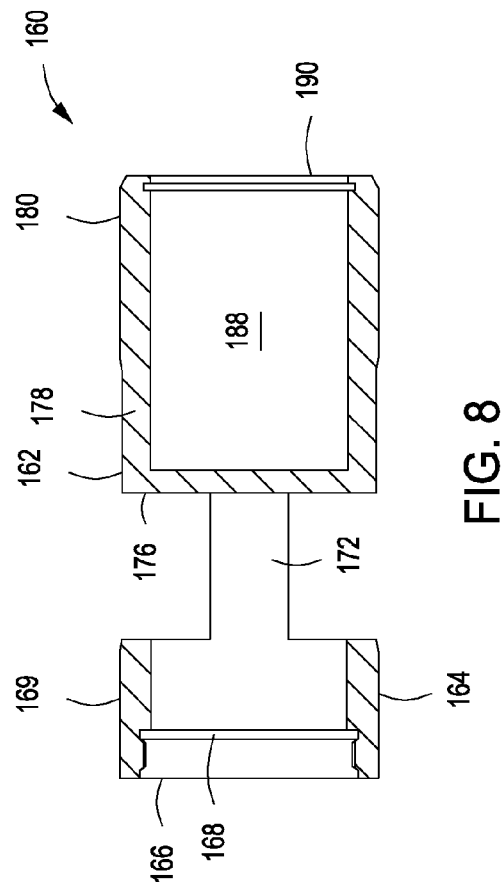
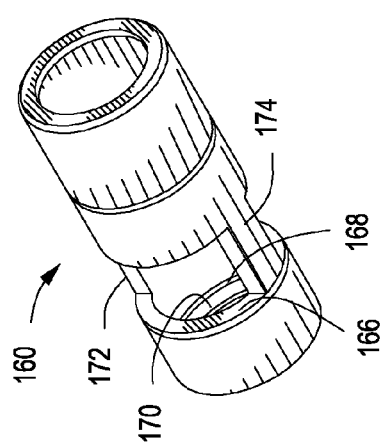
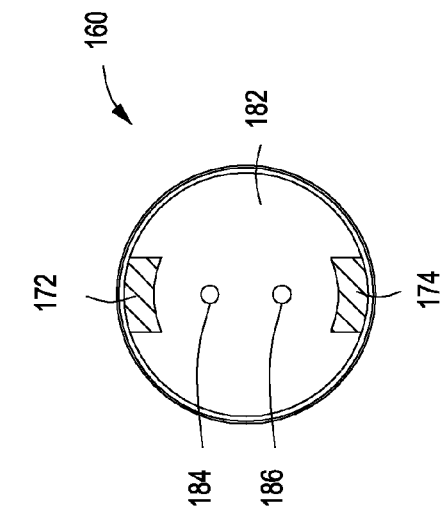
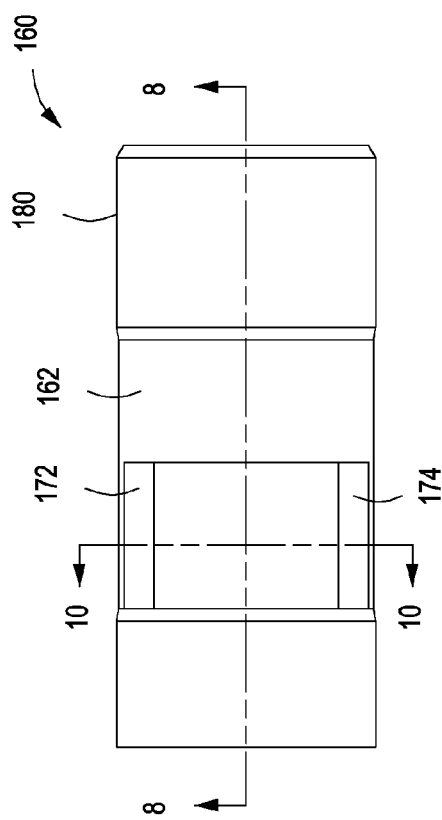

ROTARY MULTI-PORT VALVE

BACKGROUND OF THE INVENTION

1. Field of the Invention

The present invention relates generally to multi-port diverter valves which may have a single input flow of fluid and multiple output flows of fluid or in the alternative may have multiple input flows of fluid and a single output fluid flow. More particularly, the present invention concerns a rotary multi-port diverter valve mechanism having a port selector piston member that is linearly moveable within a passage of a rotary diverter member to permit selective positioning of the piston member achieve selective flow to or from a plurality of secondary flow ports and a primary flow port.

2. Description of the Prior Art

Many different types of rotary diverter valves have been developed over the years and are presently used in a wide variety of fluid handling environments. In particular, flow streams from a number of petroleum wells can be conducted through a multi-port valve so that the conditions of each of the flow streams can be measured or collected. U.S. Pat. Nos. 6,196,266 and 7,059,349 present diverting valves of this nature. In the petroleum industry, U.S. Pat. No. 6,648,070 shows an insert valve for use as a choke valve. U.S. Pat. No. 5,316,042 discloses a multi-way valve mechanism.

SUMMARY OF THE INVENTION

It is a principal feature of the present invention to provide a novel rotary multi-port valve having an internal port selector piston member that can be removed and repaired or replaced without having to remove the rotary flow selecting diverter mechanism from the valve body of the flow diverter system and without requiring removal of the multiport valve from the flow line system.

It is another feature of the present invention to provide a novel rotary multi-port valve having a hydraulic system that accomplishes movement of an internal port selector piston member to its active position with a selected secondary port of the multi-port valve and employs the stored energy of a spring package to return the port selector piston to an intermediate position permitting rotation of a rotary diverter member to any of a number of selected positions for communication with selected flow ports as desired.

Briefly, the various features and benefits of the present invention are realized by providing a multi-port valve mechanism having a valve body that defines a primary flow port in communication with an internal valve chamber and also defines a plurality of secondary flow ports each being in communication with the internal valve chamber. A rotary diverter member is rotatable within the valve chamber and has a diverter stem and a tubular trunnion member that provides for support of the rotary diverter member and has a fluid flow relationship with the primary and secondary flow ports. The rotary diverter member defines a transversely oriented internal piston receptacle within which is moveably positioned a port selector piston member that has a normal inactive position permitting rotation of the rotary diverter member for alignment of an sealing endportion of the port selector piston member with a selected secondary flow port and an active position moved linearly into sealing engagement with a sealing shoulder of each secondary flow port within the valve body. For linear movement of the port selector piston member to its active position the valve mechanism is provided with a hydraulic system that is selectively operated to provide the force that is needed for linear movement of the port selector piston. During this hydraulically energized linear movement a spring package of the port selector piston member is loaded with spring energy. To return the port selector piston member to its inactive position the pressure of the hydraulic fluid is decreased, permitting the stored spring energy to move the port selector piston member to its inactive position.

The valve body also defines a test and piston removal port that is normally closed by a test plug. With the test plug removed the port selector piston member can be moved linearly within the transversely oriented internal piston receptacle of the rotary flow diverter member and through the test port for seal replacement, servicing or repair. In the alternative, the main body of the piston member can remain within the transversely oriented piston receptacle and a seal carrier and its seal members can be disassembled from the main body and extracted via the test and piston removal port. This features permits the valve body of the multi-port valve mechanism to remain connected within a fluid handling pipe or manifold system during repair or replacement of the port selector piston member. If desired, the face seal portion of a port selector piston having replaceable molded seals or retained face seals can be inserted into the transversely oriented internal piston receptacle and the valve mechanism can be restored to service after seal replacement or repair by mounting the test plug to the valve body. The test plug is also provided with a bleed port that is normally closed by a bleed plug member. By removing the bleed plug member, with the valve chamber depressurized and with the sealing end of the port selector piston member in sealing engagement with a selected one of the secondary flow ports, any seal leakage that may be occurring will be evidenced at the test plug opening. This feature is generally known in the industry as "double block and bleed testing" and is employed for determination of seal integrity.

The valve body defines a plurality of incrementally spaced recesses that are engaged by a spring urged ball detent member thus providing for ease of port selection as the rotary diverter member is rotated by means of a diverter stem that extends upwardly through a bonnet member that form a closure for the valve chamber of the valve body.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an elevation view showing a rotary multi-port valve that is constructed according to the principles of the present invention;

FIG. 2 is a section view taken along line 2-2 of FIG. 1, and showing a port selection rotor member having a port selection piston being positioned for fluid flow through a selected outlet port;

FIG. 3 is a section view similar to the section view of FIG. 2 and showing the energized condition of the port selection piston for normal valve operation via a selected outlet port;

FIG. 4 is a section view similar to the section view of FIG. 2 and showing the position of the port selection piston for testing the integrity of the piston seals;

FIG. 5 is a section view similar to the section view of FIG. 2 and showing the de-energized condition of the port selection piston to permit rotary movement of the port selector rotor for port selection;

FIG. 6 is an exploded illustration in similar section view, showing replacement of the port selector piston and/or its seals as needed to maintain the operational efficiency of the rotary multi-port valve mechanism;

FIG. 7 is an isometric illustration showing a molded seat embodiment of a port selection piston representing an alternative embodiment of the rotary multi-port valve mechanism of the present invention;

FIG. 8 is a longitudinal section view of the port selection piston of FIG. 7;

FIG. 9 is a longitudinal elevation view of the port selection piston of FIGS. 7 and 8;

FIG. 10 is a section view of the port selection piston taken along line 10-10 of FIG. 9;

FIG. 11 is a section view showing a seat structure having molded seals having the substantially identical function of an annular outer peripheral and a face seal of the port selection piston shown in FIG. 2;

Figure 13:
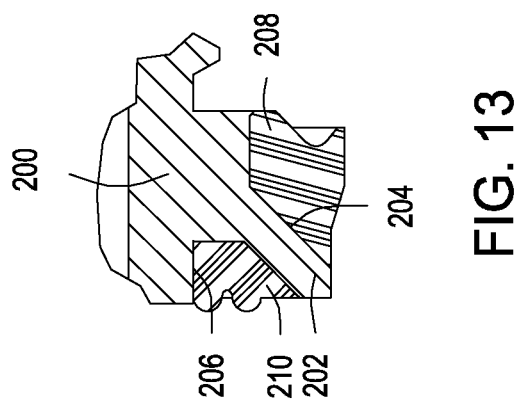
Figure 12:
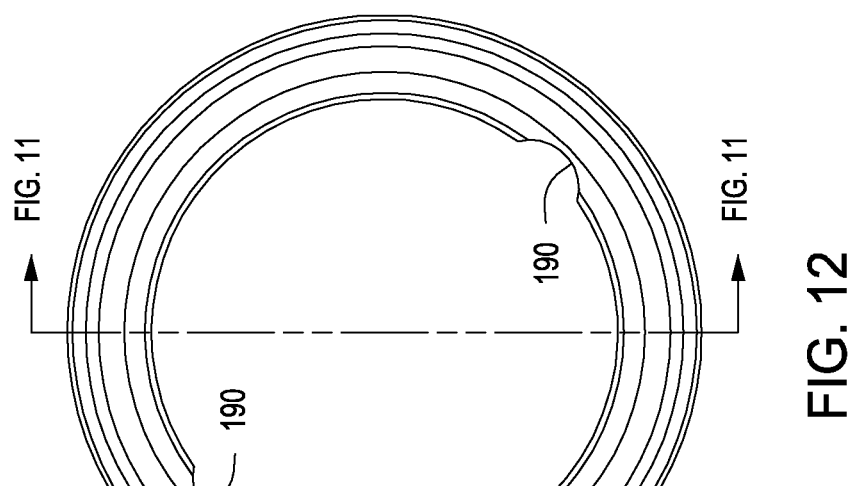
Figure 11:
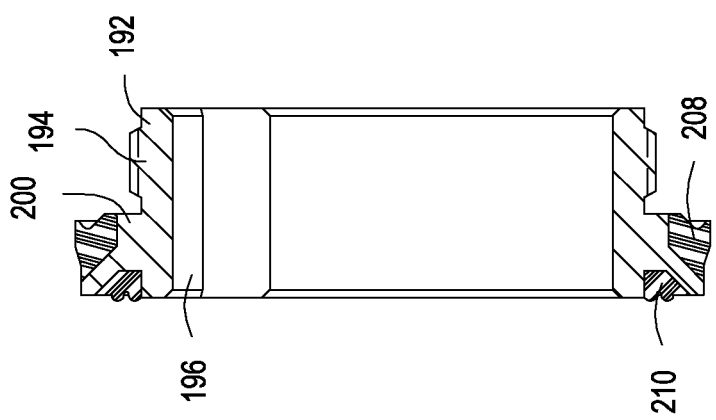
Figure 14:
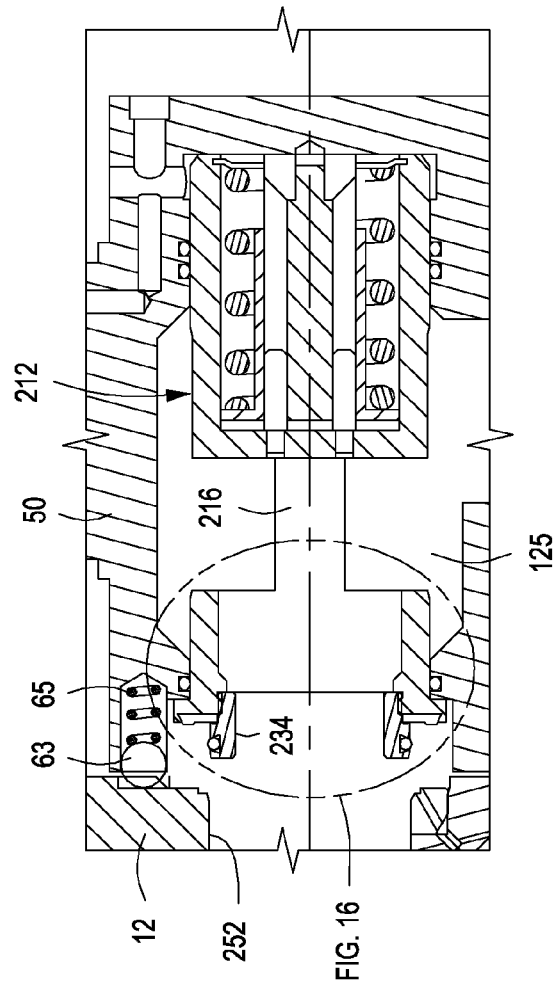
Figure 15:
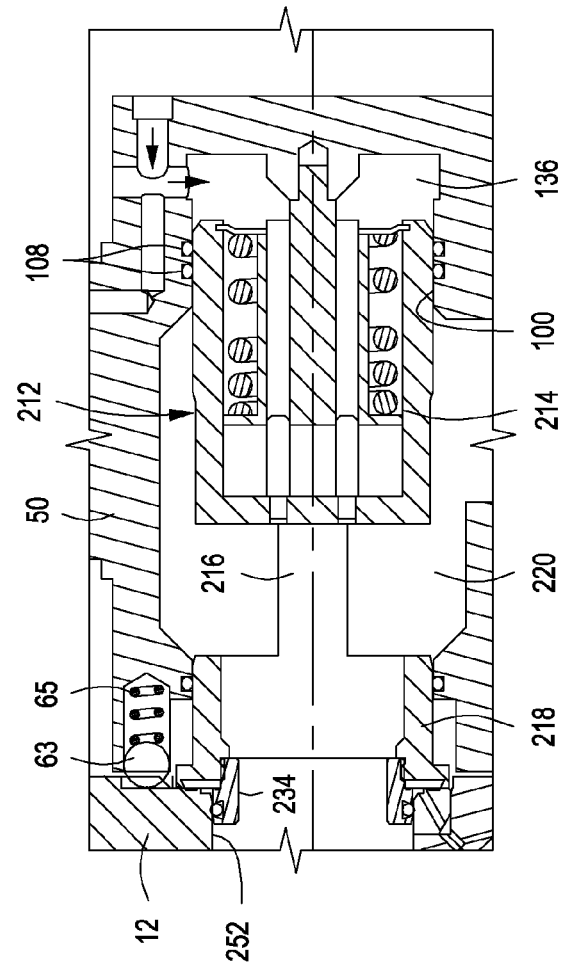
Figure 16:
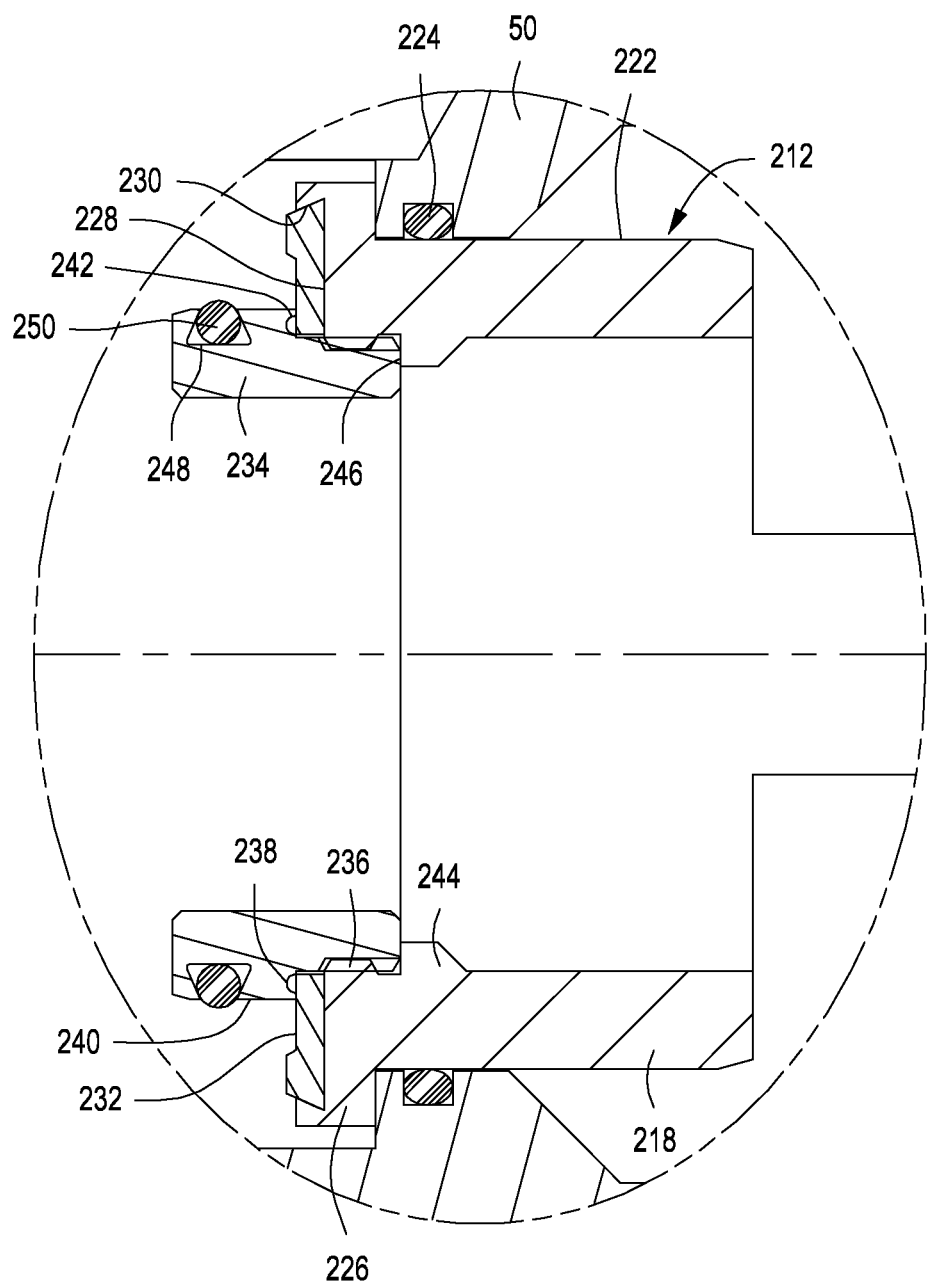

FIG. 12 is an end view of the molded seal embodiment of FIG. 11;

FIG. 13 is an enlarged section view of the lower portion of the molded seal embodiment of FIG. 11, showing the seat body and the molded outer peripheral seal and the face seal in greater detail;

FIG. 14 is a partial section view showing the retracted or non-sealing position of the port selector piston member;

FIG. 15 is a partial section view showing the sealing sealing position of the port selector piston member; and FIG. 16 is an enlarged partial section view showing the replaceable sealing end of the port selector piston member of FIGS. 14 and 15 in detail.

DETAILED DESCRIPTION OF PREFERRED EMBODIMENT

Figure 1:
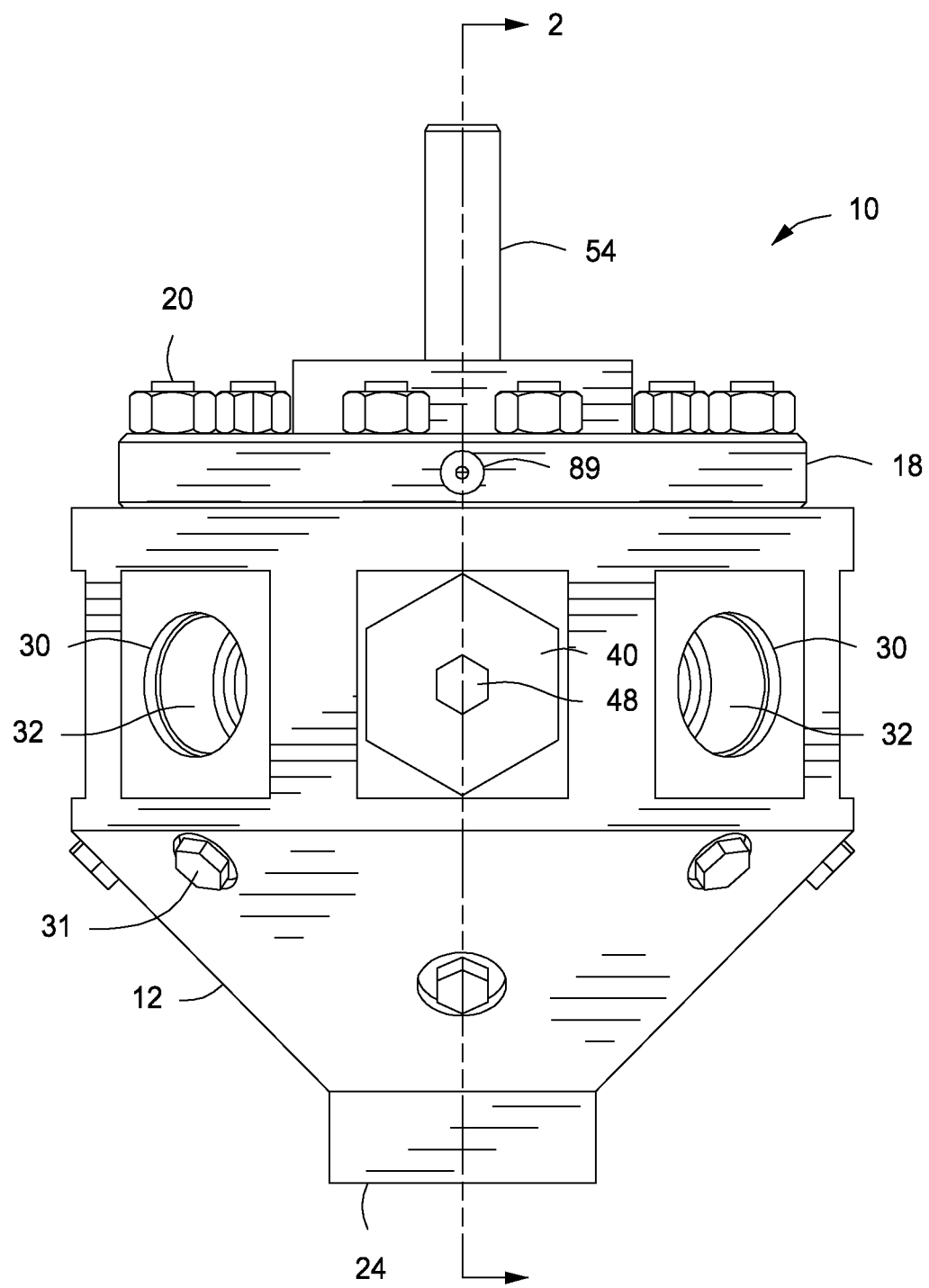
Figure 2:
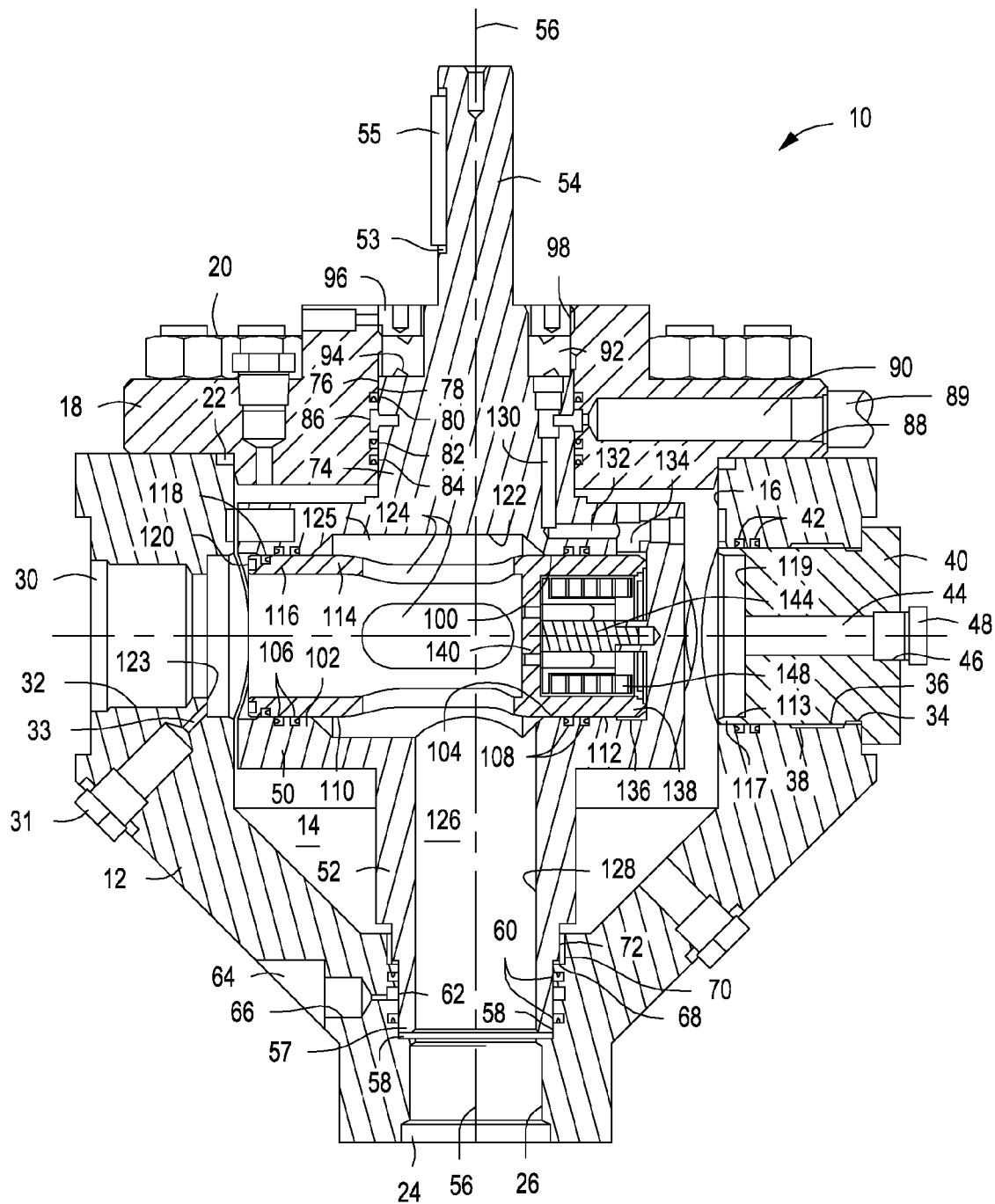

Referring now to the drawings and first to FIGS. 1 and 2, a rotary multi-port valve is shown generally at 10 and has a valve body 12 that defines a valve or diverter chamber 14. The valve body defines a valve chamber opening 16 that is closed by a bonnet member 18 that is secured to the valve body by a circular array of stud and nut retainer assemblies 20. The bonnet member is sealed to the valve body by an annular bonnet seal member 22 that is contained within an annular seal recess within the upper end portion of the valve body 12.

The valve body 12 defines a substantially centrally located lower projection 24 defining a primary flow port 26 having an internally threaded section 28 to permit a flow line to be connected with the valve body. Ordinarily, the flow port 26 will be an inlet port to receive a fluid flow to be diverted. However, if desired, the flow port 26 can be a discharge port permitting a flow from one of several sources, such as petroleum wells for example, to be selectively received and channeled to the primary flow port 26 and conducted to fluid receiving apparatus. The valve body 12 also defines a plurality of secondary ports 30 each having an internally threaded section 32 for threaded connection of a secondary flow line to the valve body in the form of a radially oriented circular array. The secondary flow ports 30 are each provided with a lubricant supply fitting 31, as shown in FIG. 2 which is in communication with a lubricant supply passage 33 that intersects an annular sealing recess within the valve body and serves to supply lubricant material to enhance the sealing capability of the valve mechanism at the secondary flow ports.

A test port 34 is defined by the valve body and has an internally threaded section 36 that receives the externally threaded section 38 of a test plug 40. Spaced internal high pressure resistant seal assemblies 42, contained within annular seal grooves within the test plug passage of the valve body establish sealing between the valve body and test plug. The test plug 40 defines a pressure relief passage 44 having an internally threaded outer section 46 which receives the external threads of a test passage closure plug 48. The closure plug member 48 may be a simple threaded plug member that can be unthreaded from an internally threaded outer section of the pressure relief passage 44 to provide the multi-port valve mechanism with the capability for double block and bleed testing for determination of seal integrity. With the valve chamber vented and with the port selector piston member at its sealed position with a selected one of the secondary flow ports, the closure plug member 48 may be unthreaded and removed. If gas, liquid or other fluid continues to flow from the pressure relief passage, this is an indication that seal leakage is occurring, thus confirming that one or more seal members have become worn or damaged to the point that seal replacement is necessary. Seal replacement can then be scheduled or can be conducted immediately. Alternatively, the test passage closure plug 48 may conveniently take the form of a pressure bleed fitting which can be selectively opened to achieve a desired pressure bleed rate. In the event of fluid leakage, the leaked fluid that may exit the test or bleed port or pressure relief passage 44 can be conducted to a catch reservoir or container to protect the environment from contamination by leaked fluid.

A rotary diverter member 50 is supported for port selective rotation within the valve chamber 14 by a downwardly projecting tubular trunnion member 52 that is preferably integral with the rotary diverter member and is also rotatably supported by a diverter stem 54 that extends upwardly from the rotary diverter member 50. The trunnion member 52 and diverter stem 54 are aligned along a vertical center-line 56 as shown in FIG. 2. The tubular trunnion member 52 has a lower extension 57 that is received with a bearing and seal receptacle 58 of the valve body and is sealed with respect to the valve body by spaced trunnion seal members 60 that are contained within axially spaced annular seal recesses within the bearing and seal receptacle 58 of the valve body.

Figure 4:
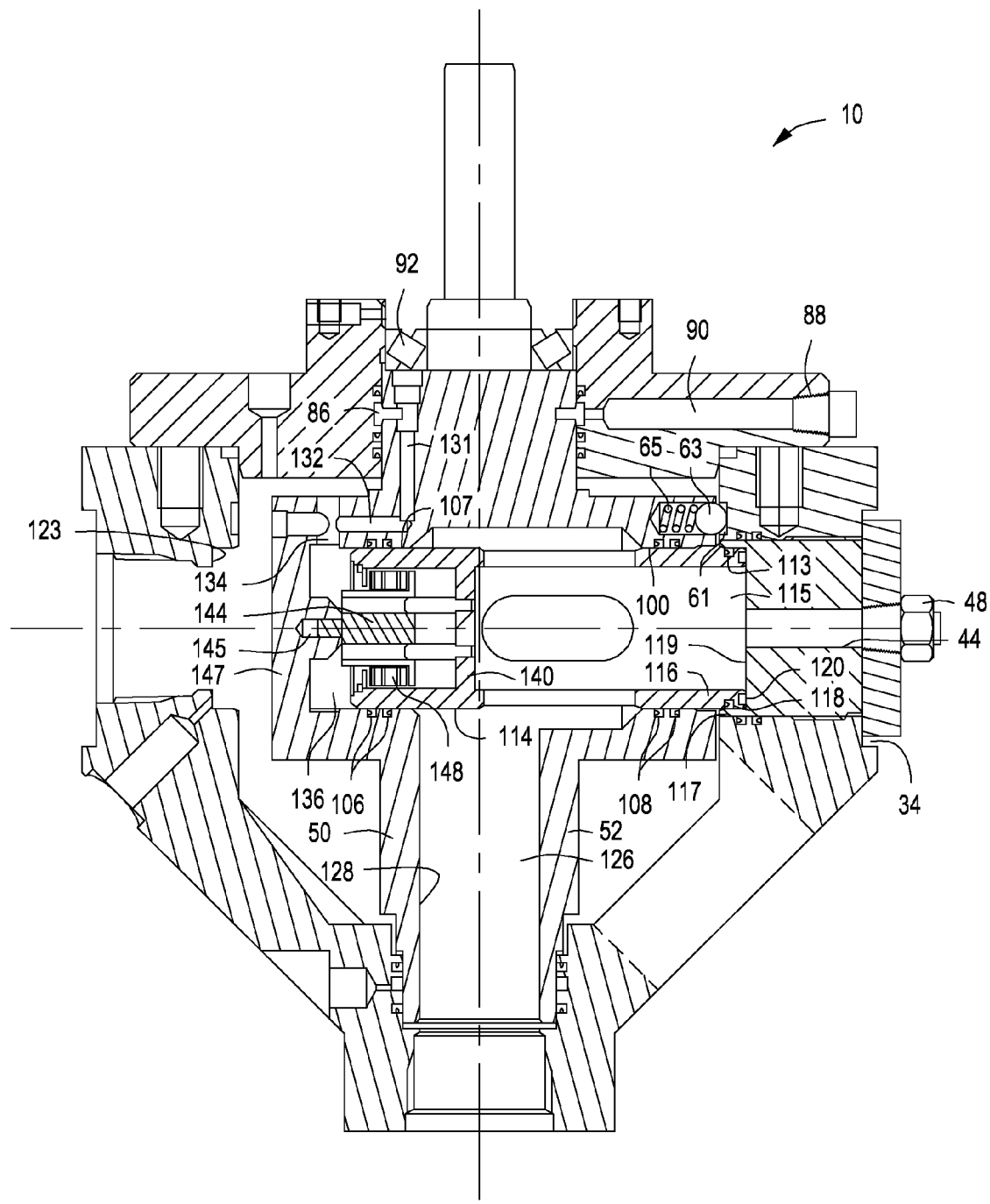

To ensure precision incremental rotation of the rotary diverter member 50, the valve body 12 defines a plurality of internal stop recesses 61, as shown in FIG. 4 which are adapted to receive a ball detent member 63 when precision alignment of the rotary diverter member 50 with any one of the plurality of flow ports 30. The ball detent 63 is continuously urged toward the internal wall structure of the valve body 12 by means of a compression spring 65. If the rotary diverter member 50 is designed for manual rotation, a relatively small manual force on the stem member will overcome the force of the compression spring and unseat the ball detent member from an internal stop recess, and permit rotation of the diverter member 50 to another selected position where the ball detent member will enter another stop recess 61 and establish precision location of the diverter member 50.

An annular internal lubricant groove 62 is defined within the bearing and seal receptacle 58 of the valve body and is located between the axially spaced annular seal recesses. Externally, the valve body defines a lubricant opening 64 having an internally threaded receptacle 66 which receives a lubricant fitting providing a supply of lubricant that is selectively injected to enhance the sealing capability of the spaced seals 60. A bearing member 68 is positioned within a bearing receptacle 70 within the upper opening of the bearing and seal receptacle 58 and is engaged by an external bearing surface 72 of the lower external extension 58 of the trunnion member 52.

The upwardly projecting valve diverter stem 54 defines an enlarged inner section 74 having a large diameter surface 76 that extends through an equally large diameter diverter stem passage 78 of the bonnet member 18. The upwardly projecting diverter stem 54 also defines a elongate key slot 53 within which is located an elongate key member 55, preferably of square cross-sectional configuration, permitting precision connection of a mechanical or electromechanical actuator device or mechanism to the diverter stem to permit precision positioning of the diverter stem for port selection, piston seal test or piston removal.

For sealing of the diverter stem to the bonnet member within the diverter stem passage 78 a plurality of annular seal members 80, 82 and 82 are positioned within annular internal seal grooves that are defined with the stem passage of the bonnet member. The bonnet member and the diverter stem collectively define annular lubricant grooves 86 that receive lubricant material from a pressurized lubricant supply that is engaged within an internally threaded section 88 of a hydraulic fluid supply receptacle 90 of the bonnet member 18. The pressure of the hydraulic fluid supply develops a force is employed for moving the port selector piston member from a neutral or non-sealing position to a sealing position with a selected one of the secondary flow ports as discussed in detail below.

A tapered roller bearing 92 is positioned within the large diameter stem passage 78 of the bonnet member and is seated on an upwardly facing annular bearing support shoulder 94 of the diverter stem member 54. A bearing retainer member 96 is threaded to an internally threaded section 98 within the bonnet member and serves to retain the tapered roller bearing in position to resist any tendency to be forced out of the stem passage 78 by the force of internal pressure acting on the pressure responsive area of the diverter stem.

For selective communication of any of the secondary flow ports with the primary flow port the rotary diverter member 50 defines a transversely oriented internal piston receptacle 100 having spaced internal annular seal sections 102 and 104. Each of the seal sections 102 and 104 has a pair of spaced internal seal members 106 and 108 disposed for sealing engagement with outer cylindrical surface portions 110 and 112 of the tubular body structure of an elongate generally tubular port selector piston member 114. The port selector piston member 114 defines a sealing end section 116 that is intended to face a selected flow port, such as shown at 30 in FIG. 2. The sealing end section 116 of the port selector piston member is provided with an external seal member 118 that is located within an external seal groove of the port selector piston member 114 and is also provided with a face seal 120, which may be of circular configuration as shown in FIG. 2 or may have other suitable sealing forms without departing from the spirit and scope of the present invention. The seals of the sealing end of the port selector piston member may also be molded seals as evidenced by FIGS. 7-13 which are discussed in detail below. At the energized condition of the port selector piston member, the annular face seal 120 of the port selector piston member is forced into sealing engagement with the annular sealing shoulder 123 of any selected secondary flow port 30.

The transversely oriented internal piston receptacle 100 is enlarged by the internal wall structure 122 between the annular seals 106 and 108, thus providing for fluid flow about an intermediate portion of the tubular port selector piston member 114. To permit this fluid flow the tubular body structure of the port selector piston member defines multiple flow openings 124. Fluid entering the open sealing end portion 116 of the port selector piston from one of the secondary flow ports 30 is enabled to flow through the flow openings 124 of the port selector piston into the annular space 125 that is defined about the port selector piston by the internal wall structure 122 of the rotary diverter member 50. The annular space 125 is in communication with a primary flow passage 126 that is defined by a generally cylindrical internal surface 128 of the tubular trunnion member 52.

The tubular port selector piston member 114 has limited linear movement within the transversely oriented internal piston receptacle 100 to permit sealed registry of the end opening section 116 with a selected secondary flow port 30 and a retracted non-sealing position of the port selector piston member to enable rotation of the rotary diverter member 50 to positions of alignment with other flow ports and to permit alignment of the sealing end 116 of the piston member with the test port for purposes of seal test or for removal all or part of the port selector piston member from the valve body for repair or replacement.

Port selector piston movement is accomplished hydraulically by injection of pressurized hydraulic fluid from a hydraulic fluid supply, such as a pump, into the hydraulic fluid supply receptacle 90. From the hydraulic fluid supply receptacle 90 the hydraulic fluid is directed into annular hydraulic fluid grooves or passages 86. The pressurized hydraulic fluid then traverses fluid passages 130, 132 and 134 to a hydraulic fluid annulus or chamber 136 that supplies hydraulic fluid pressure a closed end portion 138 of the tubular port selector piston member 114. Hydraulic fluid pressure within the chamber 136 acts on the diameter of the tubular port selector piston that is defined by engagement of the external piston seals 106 and 108 with the outer cylindrical surface 112 of the piston member. The hydraulic fluid pressure develops a force that acts on the diameter of the closed end of the piston member and moves the piston member linearly within the transversely oriented internal piston receptacle 100 toward a sealing position in engagement with one or more sealing surfaces 123 of a selected secondary flow port 30. During this hydraulically energized piston movement a spring or spring package 148 is compressed, thus storing spring energy, and remains under compression as long as the hydraulic pressure is maintained. When the hydraulic pressure within the chamber 136 is reduced, the stored energy of the spring or spring package 148 will move the port selector piston member in the opposite linear direction, extracting the sealing end section 116 of the piston member from the annular seal surface 123 of a secondary flow port 30 to a neutral or de-energized position within the transversely oriented piston receptacle 100.

Figure 3:
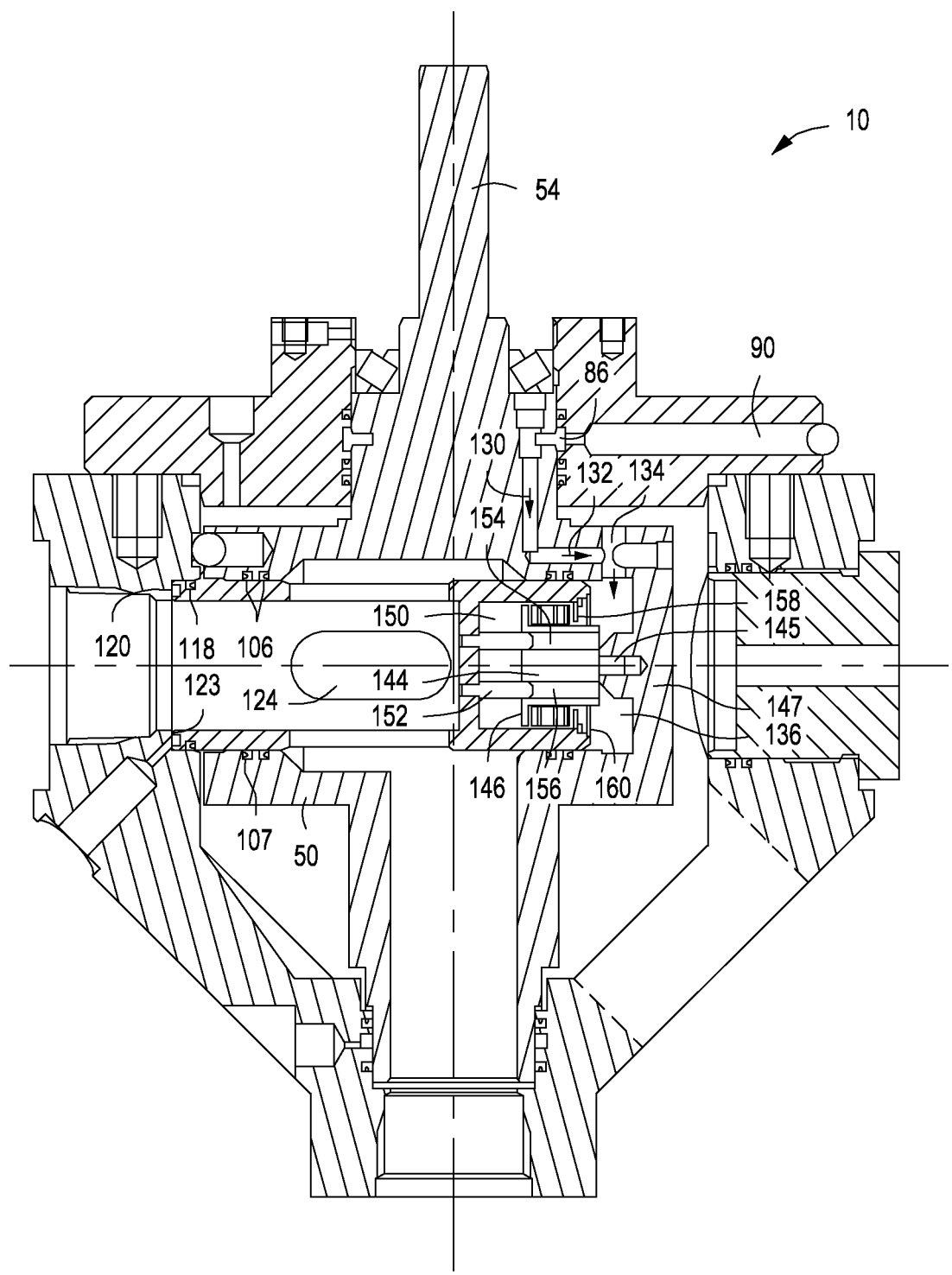
Figure 5:
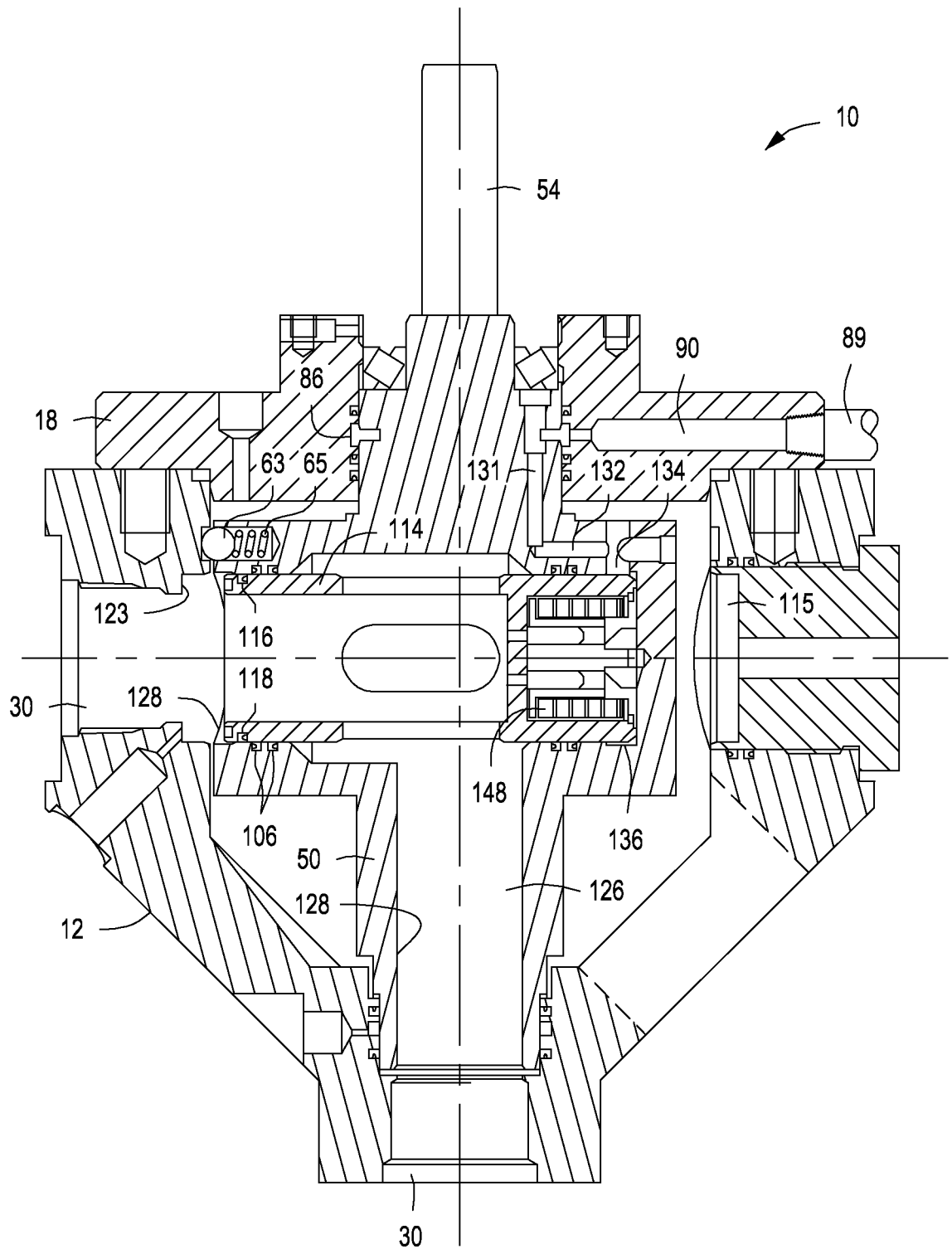

The port selector piston member has an internal transverse wall 140 that defines a spring receptacle 142 having a spring retainer member 144 that defines a spring support flange 146. The spring support flange is disposed in spring retaining engagement with a spring member 148 such as a multi-turn wave spring, a coil spring or any other energy storing device that is suitable for the intended purpose. The spring retainer member 144 has a central connector member 145 having external threads and having threaded retaining engagement with an internally threaded projection 143 of the end wall structure 147 of the rotary diverter member 50. Thus, the spring retainer member 144 is retained in substantially fixed relation with the wall structure 147 of the rotary diverter member 50. Guide members 150 and 152 are fixed to the transverse wall 140 by threaded connection or by any other suitable means of retention and have guiding engagement within guide receptacles 154 and 156 of the spring retainer member 144. The wave spring or spring package is secured in place by a spring retainer plate 158 that is retained to the port selector piston by a snap ring 160. If desired, the snap ring 160 may also include a spring retainer plate structure that secures one end of the spring package 148. When the port selector piston member is moved to the left toward its sealing position as shown in FIG. 3 the spring or spring package, being supported by the spring retainer member 144, will be compressed and will store sufficient spring energy to return the port selector piston member to its intermediate non-sealing position within the transversely oriented internal piston receptacle 100 as shown in FIG. 5. This piston spring return activity will occur when the hydraulic pressure within the chamber 136 acting on the piston member is vented to the hydraulic supply system.

When the port selector piston is hydraulically energized the spring package is compressed or additionally compressed by the force of hydraulic fluid pressure acting on the diameter of the piston member that is defined by the piston seals 108. This force urges the face seal or seals 120 at the sealing end of the port selector piston against the internal annular sealing shoulder to 123 of a selected secondary flow port 30 prevent any fluid leakage from the selected secondary flow port to the valve chamber 14. The hydraulically energized force of the sealing end of the port selector piston member against the sealing shoulder or surface resists rotational movement of the rotary diverter member 50 from its selected sealing position. As long as the hydraulic pressure is maintained within the hydraulic chamber 136 the port selector piston member will remain essentially static. As the hydraulically energized force is dissipated the stored energy of the spring or spring package will overcome the force of hydraulic pressure, thus allowing the spring expand to its original condition, and causing linear movement of the port selector piston member to its intermediate or de-energized position as shown in FIG. 5 and retracting the face seal member 120 from the sealing shoulder 123 of the selected secondary flow port. When at this de-energized position within the rotary diverter member 50, the rotary diverter member can be easily rotated to align the end opening section 116 of the port selector piston member with another one of the secondary flow ports 30 or with the test port 34. The ball detent member 63 will engage within a detent recess at each secondary flow port position, thus ensuring ease of positioning the rotary diverter member for alignment of the port selector piston member with any of the selected secondary flow ports. If desired, external positioning indicia may be provided to enable user personnel to visually ascertain desired positioning of the actuating stem member 54.

Energized Piston Condition

With reference to FIG. 3 and the embodiment of FIG. 14, the tubular port selector piston member 114 is energized by hydraulic fluid pressure developed within the hydraulic fluid supply receptacle 90 and is communicated via the annulus 86 and hydraulic fluid passages 130, 132 and 134 to the hydraulic fluid annulus or chamber 136, where the pressure acts on the diameter that is defined by engagement of the piston seals 108 with the outer cylindrical surface 112 of the piston member. Essentially, hydraulic pressure acts on the closed end portion of the tubular port selector piston member, moving it linearly to the left, as shown in FIGS. 3 and 15 within the transversely oriented internal piston receptacle 100. This linear movement of the tubular port selector piston member causes the face seal member 120 to be forced against the internal sealing shoulder 123 of the valve body 12 and establishes a seal that resists any high pressure fluid that is being handled by any of the supplemental flow lines that are connected with the supplemental flow ports of the diverter valve mechanism.

Fluid flowing into the diverter valve mechanism from the selected secondary flow port 30 flows into the tubular port selector piston member 114 and exits via the multiple flow openings 124 and is then conducted via the flow passage 126 of the tubular trunnion member 52 to the primary flow port 24 and thence to a primary flow line that is connected with the primary flow port.

Seals Test at Test Port

Double block and bleed seal leakage testing can be accomplished with the port selector piston member 114 in sealing engagement with either of the secondary flow ports, such as is shown in FIG. 2. With the valve chamber 14 vented to the atmosphere, such as by removing the vent plug 48 from the test plug 40 the valve chamber should be at atmospheric pressure and no gas or liquid should be flowing from the vent plug opening. Any flow that is occurring will be indicative of seal leakage, thus indicating that seal replacement is needed or that seal surface repair is needed. Typically, seal leakage will occur due to wear or failure of the face seal member 120. However, in time the piston seal members 106, 108 and 118 will become worn to the point of leakage and must be replaced. The seal surfaces 123 can also become worn if seal leakage is occurring and if the fluid being handled is laden with sand or other abrasive particulate.

Figure 6:
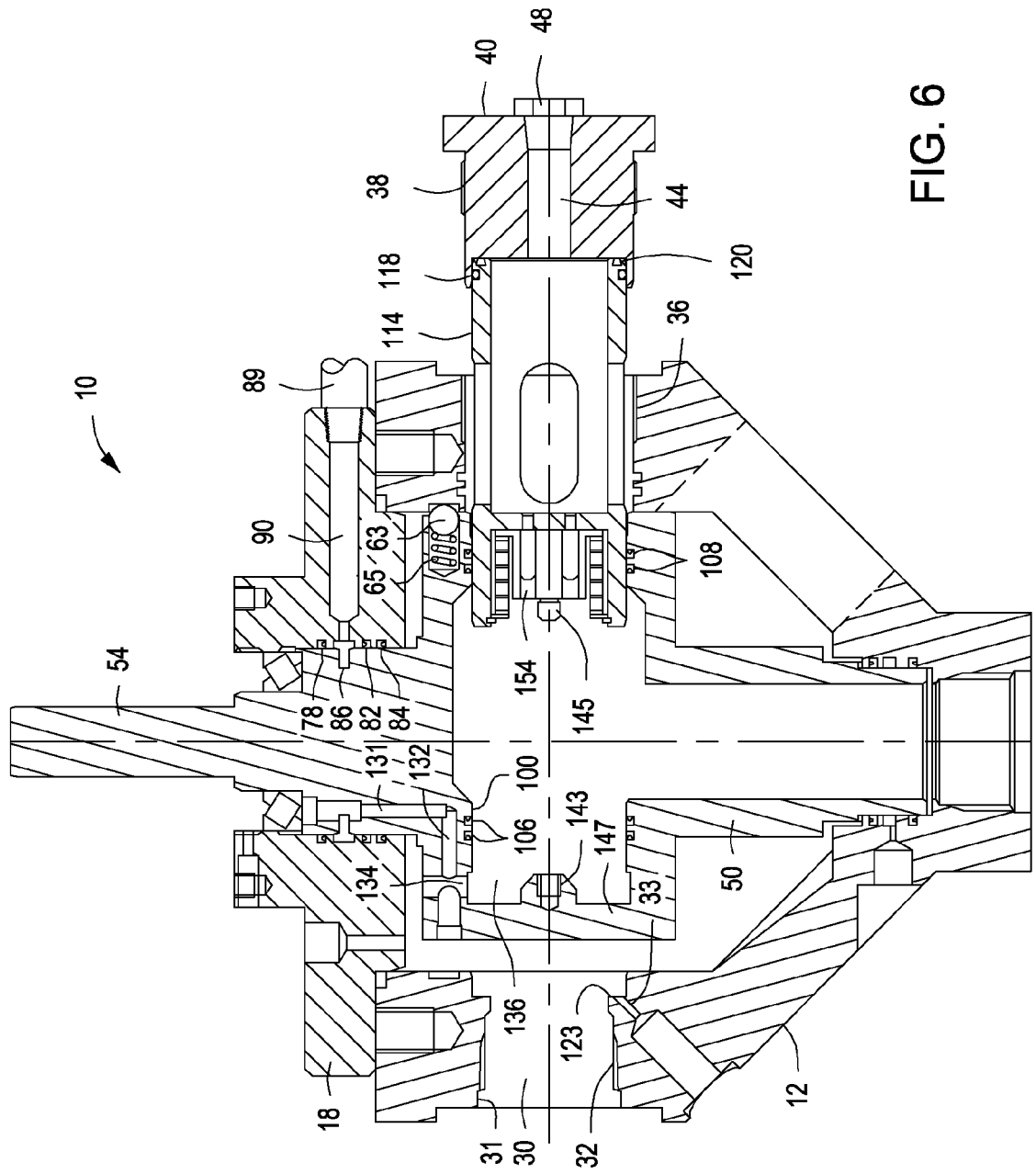

With reference to the embodiment of FIGS. 2-6 seal replacement is accomplished by removing the port selector piston member from the transversely oriented piston receptacle 100. This is accomplished according to FIG. 4 by ensuring that all of the secondary flow passages are closed and that the valve chamber has virtually no service fluid pressure. The rotary diverter member 50 is rotated to a piston servicing position aligning the sealing end section 116 of the port selector piston member 114 with the test port 34 as shown in FIG. 4. The test plug is then unthreaded and removed from the valve body as shown in FIG. 6, thus providing a valve body opening of sufficient dimension to permit the port selector piston member to be moved linearly from the transversely oriented piston receptacle 100 and through the test port 34. The face seal 120 and any other seals that are carried by the port selector piston member can be easily replaced when the port selector piston member has been extracted in this manner. Also, if desired, the internal piston seals 106 and 108 can also be replaced with fresh elastomer seals. The repaired port selector piston member can then be re-installed by moving it linearly, closed or spring end first through the test port and into the transversely oriented piston receptacle 100. Seal replacement in this manner effectively minimizes the service time that is required to maintain the efficient sealing capability of the multi-port valve mechanism, since it is not necessary to separate any of the secondary flow lines from the valve body.

The hydraulic system is energized by developing hydraulic pressure from a hydraulic supply 89, such as a hydraulic pump, which can be a hand pump, an electrically energized hydraulic pump or any other controllable source of hydraulic fluid. Hydraulic fluid pressure from the hydraulic fluid supply receptacle 90 enters the annular grooves 86 and is conducted via hydraulic fluid passages 130, 132 and 134 to the hydraulic chamber 136 where the hydraulic pressure acts on the pressure responsive area of the port selector piston member 114 that is defined by contact of the piston seals 106 with the external cylindrical surface 107 of the tubular port selector piston member 114. For testing the sealing integrity of the piston seals 106 and 108, the pressure induced force of the hydraulic fluid moves the port selector piston member 114 to the right, as shown in FIG. 4, causing the sealing end section 116 of the piston member 114 to enter a generally circular recess 115 of the test plug member which is defined by a circular external rim 117 of the test plug member 40 and by a generally planar surface 119 of the test plug which is encompassed by the circular external rim 117. This hydraulically energized movement of the tubular port selector piston member 114 causes the face seal 120 of the piston member to establish sealing engagement with the generally planar surface 119 and causes the external peripheral seal member 118 of the piston member to establish sealing engagement with the inner cylindrical sealing surface 113 of the circular rim 117 of the test plug member 40. With sealing of the sealing end of the port selector piston established within the circular rim 117 as shown in FIG. 4 the closure plug member 48 may be removed, thus permitting block and bleed testing of the face seal member of the port selector piston. At this point the plug member 48 may be unthreaded and removed. The absence of leakage through the pressure relief passage 44 will indicate that the sealing integrity of the piston seals is in good order. As shown in FIG. 4 the open or sealing end section 116 of the piston member 114 is sealed to the test plug member 40, thereby facilitating testing of the sealing integrity of the spaced seals 106, 108, and the piston end seals 118 and 120 by removing the seals test passage closure plug 48 from its threaded connection with the pressure relief passage 44. If the pressure relief passage is provided with a bleed fitting instead of the test passage closure plug 48, the bleed fitting is adjusted for controlled bleeding of pressure from the passage 44. If flow from the passage 44 stops immediately after reaching atmospheric pressure, excellent seal integrity if confirmed. If some pressure continues to flow from the pressure relief passage, this will indicate that one or more of the seals has become worn or damaged to the point of leakage and is in need of replacement.

Piston De-Energized for Port Selection

The hydraulic pressure causing movement of the tubular port selector piston member 114 causes the spring package or spring 148 to be compressed and thus loaded with spring energy. When the hydraulic fluid within hydraulic chamber 136 is bled away or reduced, the stored spring energy of the spring or spring package 148 causes opposite linear movement of the port selector piston member 114 to or toward its de-energized position within the transversely oriented internal piston receptacle 100. After this spring return activity has occurred, the rotary diverter member will be free for rotation to any other selected position within the valve body. Referring to FIG. 5, the condition of the tubular port selector piston member 114 is that no hydraulic pressure is being applied to the hydraulic chamber 136 and thus no pressure responsive force is being applied to the piston member. The spring package 148 has transmitted its stored spring energy to the piston member 114 and has moved the piston member to an intermediate position, permitting selective rotation of the rotary diverter member 50.

The diverter stem 54 will be rotated either mechanically or electromechanically as necessary to position the end opening section 116 of the port selector piston member in alignment with one of the selected secondary flow ports 30 as shown. The ball detent member 63 will assist in aligning registry of the port selector piston by causing the rotary diverter member 50 to stop at any selected rotary location. Typically there will be an audible click sound when the ball detent has entered the intended detent slot. When the desired position of the rotary diverter member 50 has been reached, the hydraulic pressure within the hydraulic fluid supply receptacle 90 will be increased, thereby causing hydraulically generated force to move the tubular port selector piston member 114 linearly toward its sealing position. This hydraulically actuated movement of the port selector piston member causes the spring package 148 to become compressed and thus loaded with spring energy. The hydraulic pressure will be increased until the circular sealing end 116 of the port selector piston has been moved into sealing engagement with the internal sealing shoulder 123 of a selected secondary flow port of the valve body as shown in FIG. 3.

Piston/Seal Replacement

Referring now to FIGS. 4 and 6, the tubular port selector piston member 114, in its de-energized condition, as shown in FIG. 5, will permit the diverter member 50 to be rotated by rotary movement of the diverter stem 54. As shown in FIG. 4, selective rotation of the rotary diverter member 50 to a position aligning the sealing end of the port selector piston member 114 with the test plug member 40 will then be accomplished. With the valve mechanism off-line and not under internal pressure, as confirmed by removal of the plug member 48 from the pressure relief passage 44 of the test plug, the test plug 40 will then be removed by unthreading it from the internally threaded section 36 of the valve body 12. This activity exposes the test port 34 which is of greater internal diameter than the external diameter of the port selector piston member.

The tubular port selector piston member 114 is then simply extracted linearly from the transversely oriented internal piston receptacle 100 through the test port 34. Service personnel need only apply sufficient endwise force to overcome the resistance of the annular seal members 106 and 108 with the generally cylindrical outer peripheral surfaces 110 and 112 of the tubular port selector piston member 114. With the piston member removed from the transversely oriented internal piston receptacle 100, the internal seal members 42, 106 and 108 can be easily replaced. The various external seals of the port selector piston member can then be replaced, after which the seal restored piston member can be inserted endwise into the transversely oriented internal piston receptacle 100. The seal replacement process is then completed by inserting the test plug member 40 into the test plug opening of the valve body 12 and threading it in place. If desired, the closure plug member 48 may have been removed from the pressure relief passage 44 to ensure the absence of pressure within the valve chamber during installation of the seal restored port selector piston member 114.

If desired, as shown in FIGS. 7-16 and explained in detail below, the main body structure of the port selector piston member may be permitted to remain within the transversely oriented piston receptacle of the rotary diverter member and a sealing end portion of the piston member may be separated from the piston body structure and removed for seal replacement. The piston seals will remain in sealing engagement with the outer cylindrical sealing surface of the piston body, thus preventing the loss of hydraulic fluid and ensuring that the hydraulic fluid in the hydraulic passages and chambers do not become contaminated during seal replacement operations.

Port Selector Piston Having Molded Seals

While a port selector piston member having replaceable annular seal members has been presented above, it is considered desirable to also provide an embodiment of a port selector piston member having molded seals and which permits simple and efficient piston replacement without necessitating removing the basic piston body structure from the transversely oriented piston receptacle of the diverter member.

With reference to FIGS. 7-13 a port selector piston member having molded seals is shown generally at 160. FIG. 7 is an isometric illustration of the assembled port selector piston member 160. FIG. 10 is a section view taken along line 8-8 of FIG. 9 and basically shows the metal frame or body structure 162 of the port selector piston member 160. An sealing end-section 164, shown in FIG. 8 is of generally cylindrical configuration and defines spaced internal end grooves 166 and 168, between which is located an enlarged diameter section 170 that is internally threaded. A seal carrier member having any suitable types of sealing members is threaded to the internally threaded section 170 so that the main body structure of the port selector piston member can remain in place during seal replacement. The outer cylindrical surface 169 of the sealing end section 164, as shown in FIG. 8 serves as an outer peripheral sealing surface that is engaged by spaced internal piston seals of the transversely oriented piston receptacle 100 of the rotary diverter member 50, such as shown at 106 in FIG. 2.

A pair of connecting strap members 172 and 174 are integral with the sealing end section 164 and are also integral with or fixed to an end portion 176 of a generally cylindrical tubular member 178. The tubular member 178 defines an outer cylindrical surface section and a slightly larger diameter external cylindrical surface 180 that serves as an outer peripheral sealing surface of the piston body that is engaged by spaced annular seals 108 of FIG. 1. The tubular member 178 has a closed inner end wall 182 that defines internally threaded holes 184 and 186 that serve as mounting holes for a pair of guide members 152 of a spring retainer in FIGS. 3 and 6. The tubular member 178 defines a spring package compartment 188 within which is located a spring package that may be identical with or similar to the spring package 148 of FIG. 5. An inner circular groove 190 is also provided within the spring receptacle end of the tubular member 178 which receives a snap ring or other suitable retainer member for retaining a spring or spring package within the spring compartment 188 in the manner that is shown in FIGS. 3, 5, 14 and 15.

FIGS. 11-13 illustrate a molded seal unit that is designed for attachment to the body structure of the port selector piston of FIGS. 7-10. FIG. 11 illustrates an annular seal body 192 that is composed of a suitable metal, which may be a different metal as compared with the metal of the diverted valve body or rotary diverter member. The annular seal body 192 defines an externally threaded section 194 which is intended to be threaded to the annular internally threaded section 170 of the sealing end section 164 as shown in FIG. 8. Internal recesses 196 and 198 are defined within the annular seal body 192 as shown in FIG. 12, enabling a spanner type tool to be engaged within the internal recesses and used, even in field conditions, to thread or unthread the annular seal body 192 into the threaded section 170 of the sealing end section 164 of the port selector piston. If desired, the annular seal body 192 may be unthreaded from the port selector piston member and removed, without removing the piston body from the transversely oriented internal piston receptacle 100. This feature simplifies piston face seal changes by permitting the piston body to remain within the piston receptacle 100, thus preventing the loss of hydraulic fluid during face seal changes.

The annular seal body 192 also defines an external annular seal mount 200 having an annular angulated seal support member 202 which is oriented to form annular grooves 204 and 206 on the front and rear sides of the annular angulated seal support member. Annular seal bodies 208 and 210 are molded onto the annular seal body 192, the seal body 208 serving as an out peripheral seal for the sealing end portion of the port selector piston and the seal body 210 serving as a face seal for sealing engagement with the annular sealing shoulder 123 within the valve body 12.

With reference to FIG. 6, the process for removing the test plug member 41 and then removing the port selector piston member can continue with replacement of the unserviceable port selector with the port selector piston of FIGS. 8-13. Thereafter, in the event the molded seals should become worn or damaged, the annular seal body with its worn or damaged molded seals can be easily replaced, after which the port selector piston member can be inserted into the transversely oriented internal piston receptacle 100. The test plug can then be reinstalled to place the valve mechanism back in service.

Port Selector Piston Having Replaceable Seal Carrier

Referring now to FIGS. 14-16, the partial section views illustrate a port selector piston member, shown generally at 212, which functions in essentially the same manner as discussed above in connection with FIGS. 2-5 and 11-13, but permits the seal carrier section to be removable from the piston member without necessitating removing the entire port selector piston member from the rotary diverter member 50. This feature minimizes servicing time and effort for replacement of the seal members 118 and 120 of FIG. 2 and also prevents the loss of hydraulic fluid, since a major portion of the port selector piston member 212 remains essentially undisturbed within the rotary diverter member. The piston seals 108 maintain their sealing engagement with the external cylindrical surface 112 of the port selector piston member and prevent any leakage of hydraulic fluid during piston face seal changes.

FIG. 13 shows the port selector piston member at its retracted position in readiness for port selecting rotation of the rotary diverter member, while FIG. 14 shows the port engaging and sealing condition of the port selector piston member 212. FIG. 16 is an enlarged partial longitudinal section view showing the replaceable sealing end portion of the port selector piston member 212 to more clearly identify the structural details thereof. Though the various seals as shown as O-rings, for purposes of simplicity it is to be understood that various types of annular seals or seal assemblies may be employed without departing from the spirit and scope of the present invention.

The hydraulically actuated or rear end section 214 of the port selector piston member 212 is of the same or similar construction and function as the closed hydraulically actuated rear end section 138 of the port selector piston member of FIGS. 2-4. The port selector piston member 212 is preferably in the form of an integral structure with opposed connector sections 216 interconnecting the hydraulically actuated or rear end section 214 with the annular sealing end section 218 of the piston member. The open intermediate section 220 of the port selector piston member serves as one or more flow ports and permits the flow of fluid to or from a selected one of the multiple flow ports to or from the flow passage rotary diverter member 50 and the primary flow passage 56 of the valve body 12.

The annular sealing end section 218 of the port selector piston member 212 defines an external generally cylindrical sealing surface 222 that is engaged by an annular seal member 224 that is contained within an annular seal groove of the diverter member 50 as shown in the enlarged section view of FIG. 16. An enlarged forward end 226 of the annular sealing end section 218 defines a seal seat 228 having an undercut seal retainer shoulder 230 that serves to assist in the retention of an annular face seal member 232. An annular seal retainer ring 234 is threaded to the annular sealing end section 218 of the port selector piston member at thread connection 236 and has an annular relief groove 238 that is spaced from the outer edge 240 of the seal retainer ring 234 and defines an annular seal retaining rib 242 that establishes a clamping action with the radially inner portion of the annular face seal member 232 to assist with retention of the face seal member within its seal seat 228. An internal annular flange 244 of the annular sealing end section 218 defines an annular forwardly facing stop shoulder 246 which is engaged by the annular seal retainer ring 234 to control the clamping action of the annular seal retaining rib 242 with the annular face seal member 232.

The annular seal retainer ring 234 also defines an annular seal groove 248 containing an annular seal member 250 that establishes sealing engagement with a generally cylindrical internal sealing surface 252 of a selected one of the flow ports within the body member 12 as shown in FIGS. 14 and 15. This feature ensures that the face seal member 232 remains essentially free of sand and other fluid entrained debris as the port selector piston member is moved into sealing engagement with one of the selected flow ports of the valve body.

Operation:

Assuming the hydraulic system for the rotary multiport valve mechanism is deenergized, the stored energy of the compression spring 148 will have returned the port selector piston member 114 to its intermediate position within the transversely oriented internal piston receptacle 100. At this intermediate position the port sealing end portion of the port selector piston member will be retracted from its sealing engagement with the annular sealing shoulder 123 of any selected flow port of the valve body 12, thus permitting rotation of the rotary diverter member 50 within the valve or diverter chamber 14 of the valve body. Rotation force is then applied in either rotational direction to the upwardly projecting diverter stem 54 for rotation of the diverter member 50 within the valve body.

Though the diverter stem may be rotated manually, such as by means of a manual operator mechanism, preferably a motorized rotary operator mechanism will be connected with the diverter stem and will be energized to accomplish rotation of the diverter member to a desired position for alignment of the transversely oriented internal piston receptacle 100 with a selected one of the secondary flow ports 30. For rotation of the diverter stem, sufficient rotary force must be applied to overcome the resistance of the spring urged ball detent 63 in order to free the diverter member 50 for rotation within the valve or diverter chamber 14.

After the diverter member has been positioned as desired the hydraulic system of the multiport valve mechanism is energized with sufficient pressure to overcome the force of the compression spring 148 and move the port selector piston member 114 linearly within the transversely oriented internal piston receptacle of the diverter member. This hydraulically actuated linear movement of the port selector piston member causes the face seal member 120 at the sealing end of the port selector piston member to establish sealing engagement with the annular sealing surface 123 of any of the selected secondary ports of the valve body 12. Fluid flow to or from the selected secondary flow port then passes through the flow openings 124 of the port selector piston member and through the flow passage 126 of the tubular trunnion member 52 and the primary flow port 26.

If flow to or from another of the secondary flow ports is desired, the hydraulic system is deenergized to permit return spring actuated linear movement of the port selector piston to its intermediate position to occur, after which the diverter member 50 can be rotated to another position within the valve body member 12. The hydraulic system is then pressurized to overcome the force of the return spring 148 and move the port selector piston member linearly to its sealing position with the selected secondary flow port.

If it becomes appropriate to test the sealing capability of the seals and thus determine any seal wear or damage, with the port selector piston member closed and sealed to one of the secondary flow ports the pressure test plug 48 may be unthreaded and removed from the test or pressure relief passage 44. With the valve or diverter chamber 14 vented any continuing flow of fluid, including liquid or gaseous material, will indicate that seal leakage is occurring. At that point, the multiport valve mechanism may be scheduled for seal replacement.

With reference to the embodiment shown in FIG. 2, the seals can be replaced by removing the test plug member 40 from the test port 34 of the valve body, thus providing a piston extraction port that is sufficiently large to permit removal of the port selector piston member from the body member 12. The diverter member 50 will be rotated 180° to the opposite position that is shown in FIG. 2, orienting the port sealing end of the port selector piston member in alignment with the test port 34. Service personnel will then extract the port selector piston member by grasping it and moving it linearly through the test port. The seal members may then be replaced, after which the port selector member may be passed through the test port 34 and positioned within the transversely oriented internal piston receptacle 100 of the diverter member 50. With the test plug member 40 replaced within the test port and its vent passage 44 closed by the plug member 48, the multi-port valve mechanism can be restored to service.

According to the embodiments of FIGS. 8-13 and FIGS. 14-16 replacement of the face seal and any other seals of the sealing end of the port selector piston member may be accomplished while permitting the body structure of the port selector piston member to remain positioned within the transversely oriented internal piston receptacle 100 of the rotary diverter member 50. This feature permits the external cylindrical surface portions of the piston member to be maintained in sealing engagement within the transversely oriented internal piston receptacle 100, thus ensuring that the hydraulic fluid passages and chamber remain isolated from the piston receptacle, thus preventing the loss of hydraulic fluid during seal maintenance. With the test plug 40 removed from the test port 34, maintenance personnel will unthread the face seal carrier 200 from the piston member and remove it through the test port. A replacement face seal carrier, with fresh seals installed or having molded face seals, as shown in FIGS. 11 and 13, will then be inserted through the test port and assembled with the piston body structure by threading it onto the piston body. The seal replacement process is then completed by threading the test plug 40 into the test port 34.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A method for operating a rotary multi-port valve mechanism having a valve body defining a valve chamber and having a primary flow port and a plurality of secondary flow ports having port seal surfaces and having a rotary diverter defining a flow passage and an internal transverse piston receptacle and having a port selector piston member that is linearly moveable within said transverse piston receptacle and having a sealing end and defining a piston flow port, comprising:
  rotating said rotary diverter to a position aligning said sealing end of said port selector piston member with a sealing surface of the selected secondary flow port;
  moving said port selector piston member linearly in an energizing direction within said internal transverse piston receptacle and establishing sealed engagement of said sealing end port selector piston member with said sealing surface of the selected secondary flow port;
  permitting the flow of fluid between the selected secondary flow port and said primary flow port through said piston flow port and said flow passage of said rotary diverter;
  terminating the flow of fluid between the selected secondary flow port and said primary flow port;
  moving said port selector piston member linearly in a de-energizing direction to a retracted non-sealing position within said internal transverse piston receptacle;
  rotating said rotary diverter to another position aligning said port selector piston member with an open sealing end facing a sealing surface of another selected flow port; and
  again moving said port selector piston member linearly in an energizing direction within said internal transverse piston receptacle and establishing sealed engagement of said port selector piston member with another one of said port seal surfaces.

2. The method of claim 1, comprising:
  during said step of moving said port selector piston member linearly in an energizing direction within said internal transverse piston receptacle adding stored energy to a spring, the stored energy being a spring force acting on said port selector piston member in a direction opposing said movement of said port selector piston member linearly in an energizing direction; and
  said step of moving said port selector piston member linearly in a de-energizing direction being accomplished by said spring force.

3. The method of claim 1, wherein said step of moving said port selector piston member linearly in an energizing direction within said internal transverse piston receptacle comprising:
  applying sufficient hydraulic pressure to said port selector piston member to move said port selector piston member linearly and positioning said sealing end in engagement with a selected flow port sealing surface; and
  applying sufficient hydraulic pressure to said port selector piston member to establish sealing of said sealing end of said port selector piston member with the sealing surface of the selected secondary flow port.

4. The method of claim 3, comprising:
  during said step of moving said port selector piston member linearly in an energizing direction within said internal transverse piston receptacle adding stored energy to a spring the stored energy being a spring force acting on said port selector piston member in a direction opposing said movement said port selector piston member linearly in an energizing direction;
  reducing application of hydraulic pressure to said port selector piston member; and
  said step of moving said port selector piston member linearly in a de-energizing direction being accomplished by said spring force.

5. The method of claim 1, wherein said port selector piston member is defined by a piston body member having a seal carrier member removably mounted thereto and having a seal for sealing with said sealing surface of a selected secondary flow port, said method comprising:
  separating said seal carrier member from said piston body member and removing said seal carrier member from said valve body, leaving said piston body member positioned within said internal transverse piston receptacle;
  replacing said seal carrier member and said seal; and
  mounting the replaced seal carrier member to said piston body member.

6. A rotary multi-port valve mechanism, comprising:
  a valve body defining a valve chamber and having a primary flow port and a plurality of secondary flow ports each having a sealing surface;
  a diverter member being supported for rotation within said valve chamber and defining a fluid flow passage in communication with said primary flow port, said diverter member defining a transversely oriented internal piston receptacle in fluid communication with said primary flow port;
  a port selector piston member being linearly moveable within said transversely oriented internal piston receptacle and having a sealing end thereof disposed for selective sealing engagement with a sealing surface of a selected secondary flow port;
  a spring being located within said port selector piston member and being compressed during linear movement of said port selector piston member toward a selected secondary flow port; and
  a power system developing force moving said port selector piston member linearly to a sealing position locating said sealing end in sealing engagement with a sealing surface of a selected secondary flow port, said spring being compressed and storing spring force during linear movement of said port selector piston toward a selected secondary flow port, upon reduction of said power system said stored spring force moving said port selector piston member linearly away from the selected secondary flow port withdrawing said sealing end from said selective sealing engagement with a selected flow port and freeing said diverter member for rotation within said valve body.

7. The rotary multi-port valve mechanism of claim 6, comprising:
  said power system being a hydraulic power system communicating hydraulic fluid pressure to said port selector piston member and upon being activated moving said port selector piston member linearly within said transversely oriented internal piston receptacle toward a selected secondary flow port.

8. The rotary multi-port valve mechanism of claim 6, comprising:
  a tubular trunnion member extending downwardly from said rotary diverter and having an end portion thereof in bearing supported and sealed rotary moveable relation within said valve body; and
  a flow passage being defined within said tubular trunnion member and being in fluid communication with said primary flow port.

9. The rotary multi-port valve mechanism of claim 6, comprising:
  a bonnet member being secured in sealed relation with said valve body and forming a closure for said valve chamber;

a diverter stem projecting from said diverter member and extending in sealed relation through said bonnet member; and a bearing member being positioned about said valve diverter stem and facilitating rotation of said valve diverter stem and rotation of said rotary valve diverter member within said valve chamber.

10. The rotary multi-port valve mechanism of claim 6, comprising:

a plurality of detent recesses being defined within said valve body each detent recess being located for mechanically positioning said transversely oriented internal piston receptacle of said diverter member and said port selector piston member in alignment with any of said selected secondary flow ports; and a spring urged detent member being supported by said diverter member and establishing positioning engagement with a selected one of said detent recesses and representing a position stop member for said diverter member.

11. The rotary multi-port valve mechanism of claim 6, comprising:

a test port being defined by said valve body and being of sufficiently large dimension to permit movement of said port selector piston member therethrough; and a test plug normally closing said test port and being removable when repair or replacement of said port selector piston member is desired.

12. The rotary multi-port valve mechanism of claim 11, comprising:

a seal test passage being defined within said test plug; and a seal test plug normally closing said seal test passage and being removed for block and bleed type detection of the sealing integrity of the seals of said port selector piston member.

13. The rotary multi-port valve mechanism of claim 11, comprising:

a circular sealing rim extending from said test plug and defining a seal testing recess having circular internal sealing surface; and said sealing end of said port selector piston member being received in sealing engagement with said circular internal sealing surface and facilitating block and bleed testing of piston seals without requiring removal of said test plug from said valve body.

14. The rotary multi-port valve mechanism of claim 6, comprising:

a fluid flow passage being defined by said port selector piston member and being in communication with said fluid flow passage of said rotary diverter member;

an end chamber being defined within said port selector piston member opposite said sealing end thereof and having communication with said hydraulic system; and said hydraulic system selectively communicating hydraulic pressure within said end chamber and developing sufficient pressure responsive force to move said sealing end of said port selector piston member into sealing engagement with an internal sealing surface of a selected secondary flow port.

15. The rotary multi-port valve mechanism of claim 6, comprising:

a threaded sealing end being defined by said port selector piston member;

an annular seal mount having a seal support member;

annular seal bodies being molded to said annular seal mount and said seal support member and defining an annular face seal and an annular outer peripheral seal for said sealing end of said port selector piston member; and said annular seal mount being threaded to said threaded sealing end of said port selector piston member and thus being replaceable as desired.

16. The rotary multi-port valve mechanism of claim 6, comprising:

said port selector piston member having a piston body;

a seal carrier member being releasably mounted to said piston body and having seal members; and said seal carrier member being removable from said piston body while located within said transversely oriented internal piston receptacle and being removable from said valve body through said test port while said piston body remains located in sealed relation within said transversely oriented internal piston receptacle.

17. A rotary multi-port valve mechanism, comprising:

a valve body defining a valve chamber and having a primary flow port and a plurality of secondary flow ports each having an internal sealing surface, said valve body further defining a test port being normally closed by a removable test plug;

a diverter member being supported for rotation within said valve chamber and defining fluid flow passages in communication with said primary flow port and a selected secondary flow port;

a transversely oriented internal piston receptacle being defined by said diverter member and being in fluid communication with said primary flow port; and a port selector piston member being linearly moveable within said transversely oriented internal piston receptacle and having a sealing end thereof disposed for selective sealing engagement with a sealing surface of a selected secondary flow port, said port selector piston member being removable from said transversely oriented internal piston receptacle and moveable through said test port for repair or replacement after removal of said test plug from said valve body and upon positioning of said rotary diverter member with said sealing end of said port selector piston member facing said test port.

18. The rotary multi-port valve mechanism of claim 17, comprising:

a tubular trunnion member extending downwardly from said rotary diverter member and having an end portion thereof in bearing supported and sealed rotary moveable relation within said valve body;

a flow passage being defined within said tubular trunnion member and being in fluid communication with said primary flow port;

a bonnet member being secured in sealed relation with said valve body and forming a closure for said valve chamber;

a valve diverter stem projecting from said rotary diverter member and extending in sealed relation through said bonnet member; and a bearing member being positioned about said valve diverter stem and facilitating rotation of said valve diverter stem and rotation of said rotary valve diverter member within said valve chamber.

19. The rotary multi-port valve mechanism of claim 17, comprising:

a plurality of detent recesses being defined within said valve body and each detent recess being located for positioning said rotary diverter for alignment of said sealing end of said port selector piston member with a selected one of said secondary flow ports; and a detent member being supported by said rotary diverter for positioning engagement with a selected one of said detent recesses and representing a position stop member for said rotary diverter.

20. The rotary multi-port valve mechanism of claim 17, comprising:
- a test port being defined by said valve body and being of sufficiently large dimension to permit movement of said port selector piston member therethrough;
- a test plug normally closing said test port and being removable when repair or replacement of said port selector piston member is desired;
- a seal test passage being defined within said test plug; and
- a seal test plug normally closing said seal test passage and being removed for detection of the sealing integrity of the seals of said port selector piston member.

21. The rotary multi-port valve mechanism of claim 17, comprising:
- a fluid flow passage being defined by said port selector piston member and being in communication with said fluid flow passage of said diverter member;
- a hydraulic fluid power system being defined by said valve body and said diverter member and being in communication with a piston chamber defined within said diverter member;
- said port selector piston member having a pressure responsive diameter exposed to hydraulic fluid pressure of said hydraulic fluid power system and being linearly and hydraulically moveable in a direction engaging said sealing end thereof with a selected secondary flow port;
- a spring within said port selecting piston member being compressed and storing spring force during hydraulic movement of said port selector piston member; and
- upon controlled dissipation of hydraulic pressure said stored spring force returning said port selector piston member to an intermediate position freeing said diverter member for rotation within said valve body.

22. The rotary multi-port valve mechanism of claim 17, comprising:
- said port selector piston member having a piston body being disposed in sealed relation within said transversely oriented piston receptacle; and
- an annular seal carrier having a seal member and being releasably mounted to said piston body and being removable from said piston body and removable from said transversely oriented piston receptacle for seal repair or replacement and from said valve body through said test port, leaving said piston body within said transversely oriented piston receptacle.

23. The rotary multi-port valve mechanism of claim 22, comprising:
- said port selector piston member having a sealing end defining a threaded connection;
- annular seal bodies being molded to said annular seal mount and said seal support member and defining an annular face seal and an annular outer peripheral seal for said sealing end of said port selector piston member; and
- said annular seal mount being threaded to said threaded sealing end of said port selector piston member and thus being replaceable as desired.

24. The rotary multi-port valve mechanism of claim 17, comprising:
- a wall structure of said rotary diverter member closing an end portion of said transversely oriented internal piston receptacle and defining a hydraulic chamber;
- a spring member being located within said port selector piston member and having a spring retainer mounted to said wall structure and being compressed and loaded with spring energy during hydraulically energized movement of said port selector piston member toward said energized position thereof; and
- upon decrease of hydraulic pressure within said hydraulic chamber said spring energy retracting said port selector piston member to an intermediate position within said transversely oriented internal piston receptacle and permitting rotation of said rotary diverter member to other selected positions within said valve body.

\* \* \* \* \*